(12) United States Patent
Wojcicki et al.

(10) Patent No.: US 12,469,510 B2
(45) Date of Patent: Nov. 11, 2025

(54) TRANSFORMING SPEECH SIGNALS TO ATTENUATE SPEECH OF COMPETING INDIVIDUALS AND OTHER NOISE

(71) Applicant: Cisco Technology, Inc., San Jose, CA (US)

(72) Inventors: Kamil Krzysztof Wojcicki, Kangaroo Point (AU); Xuehong Mao, San Jose, CA (US); David Guoqing Zhang, Fremont, CA (US); Samer Hijazi, San Jose, CA (US); Raul Alejandro Casas, Doylestown, PA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 293 days.

(21) Appl. No.: 17/988,376

(22) Filed: Nov. 16, 2022

(65) Prior Publication Data

US 2024/0161765 A1    May 16, 2024

(51) Int. Cl.
| | |
|---|---|
| *G10L 21/0208* | (2013.01) |
| *G06N 3/0464* | (2023.01) |
| *G06N 3/0499* | (2023.01) |
| *G06N 3/084* | (2023.01) |
| *G06N 20/00* | (2019.01) |
| *G10L 25/78* | (2013.01) |

(52) U.S. Cl.
CPC ......... *G10L 21/0208* (2013.01); *G06N 3/084* (2013.01); *G06N 20/00* (2019.01); *G10L 25/78* (2013.01); *G06N 3/0464* (2023.01); *G06N 3/0499* (2023.01)

(58) Field of Classification Search
CPC ...... G10L 21/0208; G10L 25/78; G06N 20/00
See application file for complete search history.

(56) References Cited

U.S. PATENT DOCUMENTS

| | | | |
|---|---|---|---|
| 9,640,194 B1 * | 5/2017 | Nemala | G10L 21/0232 |
| 10,614,827 B1 * | 4/2020 | Korjani | G10L 21/0364 |
| (Continued) | | | |

FOREIGN PATENT DOCUMENTS

| | | | | |
|---|---|---|---|---|
| CN | 108346433 A | * | 7/2018 | ......... G10L 21/0224 |
| EP | 4006898 A1 | * | 6/2022 | ............. G06N 3/084 |
| (Continued) | | | | |

OTHER PUBLICATIONS

Eskimez, S. et al., "Personalized Speech Enhancement: New Models and Comprehensive Evaluation," Microsoft Corporation, https://arxiv.org/pdf/2110.09625.pdf, Oct. 18, 2021, 5 pages.

(Continued)

*Primary Examiner* — Paras D Shah
*Assistant Examiner* — Oluwadamilola M Ogunbiyi
(74) *Attorney, Agent, or Firm* — Edell, Shapiro & Finnan, LLC

(57) ABSTRACT

In one example embodiment, speech signals are received from a user during a communication session. The received speech signals contain noise including speech of other individuals. The received speech signals are transformed by a machine learning model to produce transformed speech signals corresponding to the received speech signals with a reduced amount of the noise. The machine learning model is trained with speech of the user satisfying a noise threshold and collected during one or more communication sessions.

20 Claims, 9 Drawing Sheets

(56) References Cited

U.S. PATENT DOCUMENTS

| | | | | |
|---|---|---|---|---|
| 11,380,308 | B1* | 7/2022 | Pandey | G06N 20/00 |
| 11,924,367 | B1* | 3/2024 | Valin | G10L 25/18 |
| 12,008,457 | B1* | 6/2024 | Isik | G06N 3/082 |
| 2003/0220791 | A1* | 11/2003 | Toyama | G10L 15/07 |
| | | | | 704/E15.011 |
| 2009/0319263 | A1* | 12/2009 | Gupta | G10L 25/90 |
| | | | | 704/229 |
| 2011/0191101 | A1* | 8/2011 | Uhle | G10L 21/0208 |
| | | | | 704/205 |
| 2012/0203557 | A1* | 8/2012 | Odinak | G01C 21/3608 |
| | | | | 704/270.1 |
| 2014/0081631 | A1* | 3/2014 | Zhu | G10L 21/0208 |
| | | | | 704/226 |
| 2015/0281853 | A1* | 10/2015 | Eisner | H04R 25/505 |
| | | | | 381/312 |
| 2017/0245127 | A1* | 8/2017 | Pedersen | H04W 4/025 |
| 2017/0323653 | A1* | 11/2017 | Hassan al Banna | G10L 25/84 |
| 2019/0042988 | A1* | 2/2019 | Brown | G06F 16/9535 |
| 2019/0043516 | A1* | 2/2019 | Germain | G10L 15/16 |
| 2019/0132687 | A1* | 5/2019 | Santos | H04R 25/50 |
| 2019/0228791 | A1* | 7/2019 | Sun | G10L 25/78 |
| 2019/0341052 | A1* | 11/2019 | Allibhai | G06N 3/045 |
| 2020/0005766 | A1* | 1/2020 | Kim | G10L 15/02 |
| 2020/0134370 | A1* | 4/2020 | Chopra | G08G 5/0021 |
| 2020/0202179 | A1* | 6/2020 | Rajarathinam | G06N 5/04 |
| 2020/0294522 | A1* | 9/2020 | Zhang | H04R 1/406 |
| 2020/0312336 | A1* | 10/2020 | Kang | G06N 3/08 |
| 2021/0012767 | A1* | 1/2021 | Kupryjanow | G10L 21/0208 |
| 2021/0035594 | A1* | 2/2021 | Kang | G10L 21/0216 |
| 2021/0043220 | A1* | 2/2021 | Baek | H04R 1/406 |
| 2021/0125625 | A1* | 4/2021 | Huang | G10L 25/21 |
| 2021/0142820 | A1* | 5/2021 | Raikar | G10L 25/63 |
| 2021/0193162 | A1* | 6/2021 | Hook | G10L 17/00 |
| 2021/0287691 | A1* | 9/2021 | Rudberg | G06N 20/00 |
| 2021/0343305 | A1* | 11/2021 | Jin | G10L 21/0364 |
| 2021/0344560 | A1* | 11/2021 | Alameh | A61B 5/165 |
| 2022/0084509 | A1 | 3/2022 | Sivaraman et al. | |
| 2022/0114594 | A1* | 4/2022 | Nunes | G06Q 20/4016 |
| 2022/0130398 | A1* | 4/2022 | Coman | G06F 40/35 |
| 2022/0139388 | A1* | 5/2022 | Sharifi | H04M 3/4931 |
| | | | | 704/231 |
| 2022/0148571 | A1* | 5/2022 | Wang | G10L 21/02 |
| 2022/0199102 | A1 | 6/2022 | Ostrand et al. | |
| 2022/0237271 | A1* | 7/2022 | Patel | G06F 21/35 |
| 2022/0270625 | A1* | 8/2022 | Dai | G10L 21/02 |
| 2022/0284915 | A1* | 9/2022 | Rosenwein | G10L 21/0216 |
| 2022/0328034 | A1* | 10/2022 | Tv | G06F 40/30 |
| 2023/0037939 | A1* | 2/2023 | Shin | G10L 21/02 |
| 2023/0063260 | A1* | 3/2023 | Nielsen | H04R 3/005 |
| 2023/0076871 | A1* | 3/2023 | Müller | H04R 1/1083 |
| 2023/0086832 | A1* | 3/2023 | Tadesse | G10L 21/0232 |
| | | | | 704/226 |
| 2023/0291563 | A1* | 9/2023 | Pan | H04M 1/72463 |
| 2023/0298593 | A1* | 9/2023 | Ramos | G10L 17/02 |
| | | | | 704/233 |
| 2023/0368809 | A1* | 11/2023 | Wang | G10L 25/21 |
| 2024/0005939 | A1* | 1/2024 | Cutler | G10L 15/16 |
| 2024/0112690 | A1* | 4/2024 | Faubel | G10L 25/30 |
| 2024/0170003 | A1* | 5/2024 | Le Roux | G10L 25/30 |
| 2024/0194212 | A1* | 6/2024 | Chen | G10L 25/30 |
| 2024/0194214 | A1* | 6/2024 | Fang | G10L 21/0324 |
| 2024/0273447 | A1* | 8/2024 | Pripstein | G06Q 30/0202 |

FOREIGN PATENT DOCUMENTS

| | | | | |
|---|---|---|---|---|
| EP | 3516652 | B1 * | 9/2022 | G10L 17/02 |
| EP | 4004906 | B1 * | 2/2025 | G06N 7/01 |
| WO | WO-2019178125 | A1 * | 9/2019 | G06N 20/00 |
| WO | WO-2021012734 | A1 * | 1/2021 | G06N 20/00 |
| WO | WO-2021108991 | A1 * | 6/2021 | |
| WO | WO-2022086045 | A1 * | 4/2022 | |
| WO | WO-2022131566 | A1 * | 6/2022 | G10L 13/02 |
| WO | WO-2024018390 | A1 * | 1/2024 | G10L 21/0208 |

OTHER PUBLICATIONS

Reddy, C. et al., "The Interspeech 2020 Deep Noise Suppression Challenge: Datasets, Subjective Testing Framework, and Challenge Results," Microsoft Corporation, https://arxiv.org/ftp/arxiv/papers/2005/2005.13981.pdf, Oct. 2020, 5 pages.

Guduguntla, P., "BackgroundNoise Removal: Traditional vs AI Algorithms," Comparing deep learning noise removal models to older subtractive models, published in Towards Data Science, https://towardsdatascience.com/background-noise-removal-traditional-vs-ai-algorithms-9e7ec5776173, Mar. 18, 2021, 7 pages.

Sun L., et al. "A Two-stage Single-channel Speaker-dependent Speech Separation Approach for Chime-5 Challenge," ICASSP 2019—2019 IEEE International Conference on Acoustics, Speech and Signal Processing (ICASSP), Apr. 17, 2019, 5 pages.

Giri, R., et al. "A novel target speaker dependent postfiltering approach for multichannel speech enhancement," 2017 IEEE Workshop on Applications of Signal Processing to Audio and Acoustics (WASPAA), Dec. 11, 2017, 5 pages.

Newscientist, "Machine Learning," Newsletters, https://www.newscientist.com/article-topic/machine-learning/, retrieved Nov. 9, 2022, 1 page.

Gray, R., "An AI has learned how to pick a single voice out of a crowd," https://www.newscientist.com/article/2151268-an-ai-has-learned-how-to-pick-a-single-voice-out-of-a-crowd/#ixzz7XV3v30oq, Oct. 24, 2017, 2 pages.

Cimpanu, C., "Google Develops AI That Can Separate Voices in a Crowd," https://www.bleepingcomputer.com/news/technology/google-develops-ai-that-can-separate-voices-in-a-crowd/, Apr. 23, 2018, 14 pages.

Kuo, C. et al., Technical Disclosure Commons, "Enhanced call quality using user-specific voiceprint model," Defensive Publications Series, https://www.tdcommons.org/dpubs_series/1921, Jan. 30, 2019, 10 pages.

Rubinstein, M., "Looking to Listen: Audio-Visual Speech Separation (SIGGRAPH 2018)," https://www.youtube.com/watch?v=rVQVAPiJWKU, retrieved Nov. 9, 2022, 1 page.

* cited by examiner

TRANSFORMING SPEECH SIGNALS TO ATTENUATE SPEECH OF COMPETING INDIVIDUALS AND OTHER NOISE

TECHNICAL FIELD

The present disclosure relates to voice and speech processing.

BACKGROUND

Video conferencing systems include speech enhancement or noise reduction signal processing subsystems to reduce background ambient and transient noises in a call. These subsystems are also able to remove unwanted background speech to some extent. However, the subsystems can be ineffective when competing speech is approximately the same level as speech of a target speaker. This may happen, for example, when a competing speaker is in the foreground and close to the target speaker and/or close to a microphone of the target speaker.

DETAILED DESCRIPTION

Overview

Figure 1:
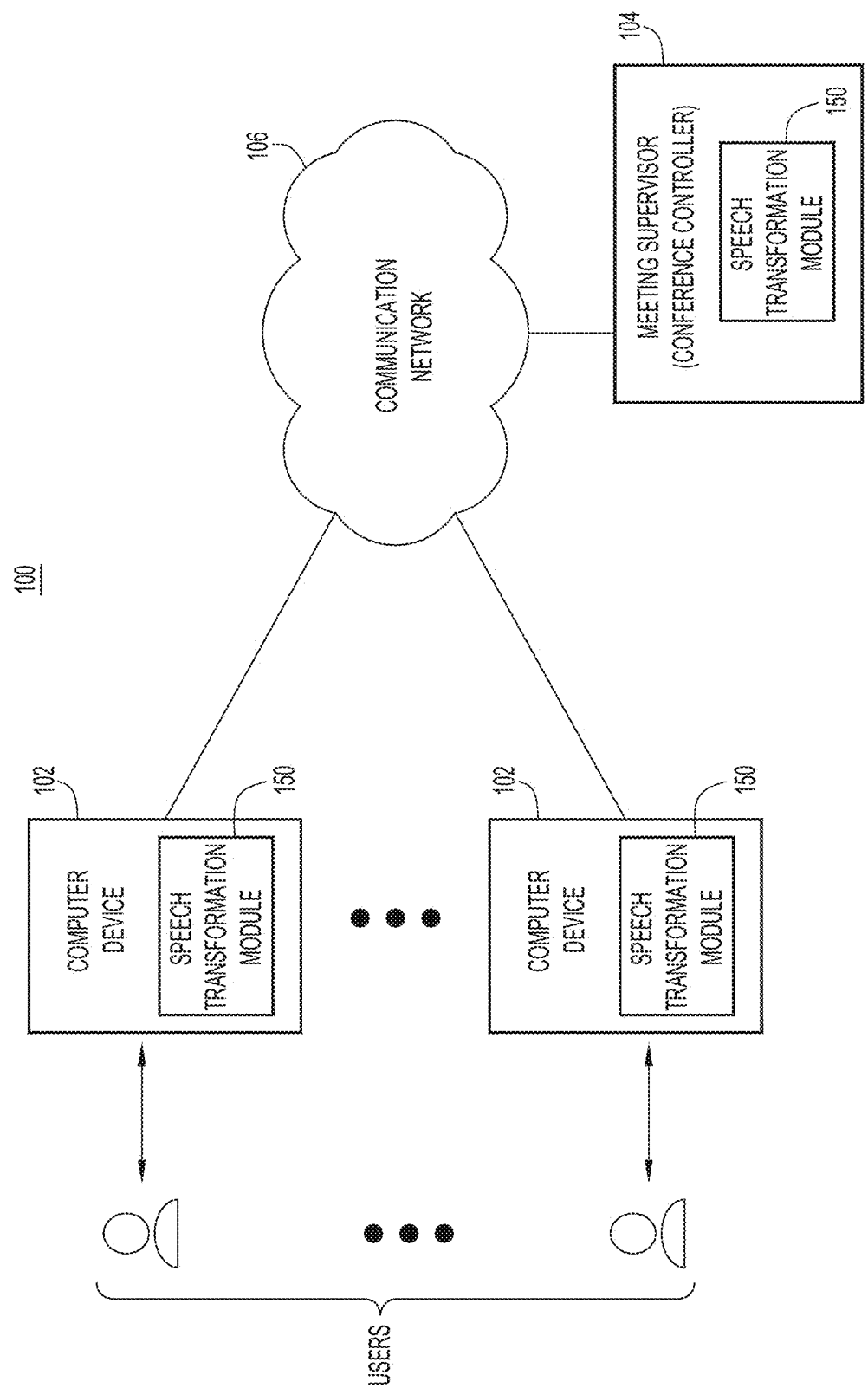
FIG. 1 is a block diagram of an example online meeting environment in which transformation of speech signals to attenuate noise may be implemented, according to an example embodiment.

In one example embodiment, speech signals are received from a user during a communication session. The received speech signals contain noise including speech of other individuals. The received speech signals are transformed by a machine learning model to produce transformed speech signals corresponding to the received speech signals with a reduced amount of the noise. The machine learning model is trained with speech of the user satisfying a noise threshold and collected during one or more communication sessions.

EXAMPLE EMBODIMENTS

An example embodiment effectively removes unwanted speech from a competing individual speaking or talking in a foreground (e.g., within proximity of a user or user microphone, etc.). Since background noise removal (BNR) systems are not capable of eliminating competing speech from individuals that are close to a target user, the example embodiment provides a personalized system that may be trained with speech from a user to attenuate (e.g., reduce or remove) speech of competing individuals. In addition, the example embodiment avoids howling with multiple laptops in a same room. The system may be used for teleconferencing in crowded environments, such as calling centers and cafes.

An example embodiment preserves speech of a target user and attenuates (e.g., reduces or blocks) speech of other individuals. The example embodiment may also attenuate (e.g., reduce or remove) background noise. The example embodiment collects clean segments of speech (e.g., with no or low levels of competing-talker and other noise) from the target user during live video conferencing calls or other communication sessions. The collected speech is used to adapt or personalize (e.g., offline or during the communication session) a general speech enhancement model into a personalized model when a sufficient amount of clean speech has been collected.

In an example embodiment, a speech enhancement neural network is personalized or trained with a noisy input to generate an output that matches clean speech. The noisy input is synthesized by mixing or combining the user clean speech with speech of other individuals at varying amplitude or power levels and other noise from training datasets. Reverberation may also be applied to speech and noise recordings to model typical acoustic environments. The personalized neural network is periodically evaluated to determine that a current version of the neural network provides competing individual speech and other noise performance that is superior to a prior version of the neural network. The personalization and evaluation results in a system that is well-tailored to the target user and provides superior competing-talker and other noise attenuation. The personalization and evaluation can continuously track the speaker over long periods of time. The personalization and evaluation may be performed at the edge, on a video conferencing user laptop, and/or on the cloud where conferencing media is routed to other meeting participants.

In an example embodiment, ambient sounds during speech-free segments of live meetings or other communication sessions are detected and recorded to supplement noise datasets used in training with a form of personalized noise. Various characteristics (e.g., classification of the ambient sounds into noise categories, distribution of types of noises, etc.) may further be used to improve the personalized neural network. For example, when a user in a home office has a dog that barks during calls, the example embodiment provides improved attenuation of the dog bark.

In an example embodiment, a database of speech features and a neural network model (e.g., coefficients or weights) for each user is maintained as a form of speech enhancement library. This library may be accessed to accelerate personalizing a neural network for a user (e.g., a new or other user lacking a personalized model, etc.). This may be accomplished by matching speech features of the user to speech features of other users stored in the library. The neural network corresponding to a best match is selected as an initial neural network for adaptation or personalization to the user. Features for identifying the neural network in the library may be derived from features used for speaker recognition, or from clustering techniques.

In an example embodiment, bandwidth extension and/or speech compression may also be performed.

While the present embodiments are described with respect to attenuating (e.g., reducing or removing) background speech of competing individuals and/or other noise for an online meeting, it will be appreciated that the attenuation may be performed for any scenarios or activities involving background speech and/or other noise (e.g., telephone or other calls, communications, audio messages, speech and/or voice recognition systems, public address systems, voice responsive systems for performing actions, etc.).

FIG. 1 illustrates a block diagram of an example online meeting environment 100 in which an embodiment presented herein may be implemented. Environment 100 includes multiple computer devices 102 (collectively referred to as computer devices, participant devices, or platforms) operated by local users/participants, a meeting supervisor or server (also referred to as a "conference controller") 104 configured to support online (e.g., web-based or over-a-network) collaborative meetings between the computer devices, and a communication network 106 communicatively coupled to the computer devices and the meeting supervisor. Computer devices 102 can take on a variety of forms, including a smartphone, tablet, laptop computer, desktop computer, video conference endpoint, and the like.

Communication network 106 may include one or more wide area networks (WANs), such as the Internet, and one or more local area networks (LANs). Computer devices 102 may communicate with each other, and with meeting supervisor 104, over communication network 106 using a variety of known or hereafter developed communication protocols. For example, the computer devices 102 and meeting supervisor 104 may exchange Internet Protocol (IP) data packets, Realtime Transport Protocol (RTP) media packets (e.g., audio and video packets), and so on.

Computer devices 102 may each host an online meeting application used to establish/join online meetings and a speech transformation module 150. According to embodiments presented herein, speech transformation module 150 of the computer device transforms speech signals of a target user to produce speech signals with attenuated (e.g., reduced or removed) noise (e.g., speech of competing individuals, sounds of a surrounding environment, etc.) as described below. In an embodiment, meeting supervisor 104 or other server system coupled to communication network 106 may host speech transformation module 150 to transform speech signals to attenuate (e.g., reduce or remove) noise in substantially the same manner described below. In this case, speech signals of a user of a computer device 102 containing one or more forms of noise (e.g., speech of competing individuals, sounds of a surrounding environment, noise from a microphone or other devices, etc.) may be provided to speech transformation module 150 on meeting supervisor 104 for processing (e.g., as audio signals, etc.) and the resulting transformed speech signals with attenuated (e.g., reduced or removed) noise are distributed to computer devices 102 for conveyance to meeting participants via corresponding audio speakers.

Figure 2:
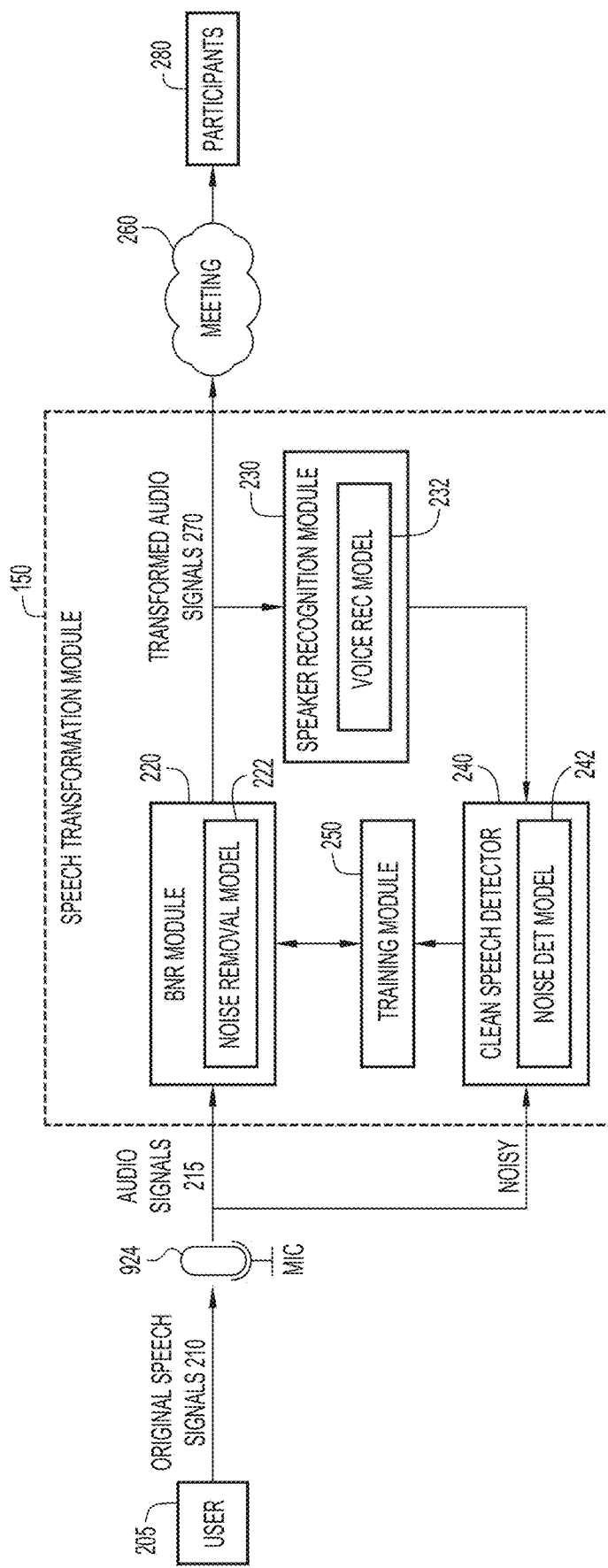
FIG. 2 illustrates a block diagram of a system configured for transforming speech signals to attenuate noise, according to an example embodiment.

With continued reference to FIG. 1, FIG. 2 illustrates speech transformation module 150 implemented on a computer device 102 and configured for transforming speech signals of a user to attenuate (e.g., reduce or remove) noise according to an example embodiment. While FIG. 2 is described with respect to transforming speech signals of a participant of an online meeting, it will be appreciated that speech signals may be transformed for any scenarios or activities involving voice (e.g., telephone or other calls, communications, audio messages, speech and/or voice recognition systems, public address systems, voice responsive systems for performing actions, etc.). Further, speech transformation module 150 may be hosted on other computing devices (e.g., meeting supervisor 104, etc.) and transform speech signals in substantially the same manner described below.

Initially, computer device 102 enables a user 205 to join an online meeting 260. In an embodiment, computer device 102 includes a camera or other image capture device 926 (FIG. 9) to capture images (e.g., still images, video, etc.) of the user and a surrounding environment, a microphone or other sound sensing device 924 to capture speech or voice signals 210 of user 205 and produce audio signals 215 representing the speech signals for processing by computer device 102, and a display or monitor 930 to present meeting content to the user.

Speech transformation module 150 includes a background noise removal (BNR) module 220, a speaker recognition module 230, a clean speech detector 240, and a training module 250. Speech signals 210 from user 205 are captured by microphone 924. The microphone produces audio signals 215 (corresponding to speech signals 210) that are provided to speech transformation module 150 for processing.

Audio signals 215 are provided to background noise removal (BNR) module 220 for processing. Speech signals 210 (and audio signals 215) may include user speech or voice and/or noise (e.g., speech of competing individuals near the user, sounds of a surrounding environment, noise from a microphone or other devices, etc.). The BNR module employs a noise removal model 222 to produce transformed audio or speech signals 270 that enhance the user speech while attenuating (e.g., reducing or removing) the noise. The noise removal model may include a machine learning model as described below. The transformed audio signals may be provided to online meeting 260 for distribution to meeting participants 280. Alternatively, the speech transformation module may be hosted by a server for the online meeting (e.g., meeting supervisor 104, etc.) to produce transformed audio signals 270 for distribution to the meeting participants. The transformed audio signals may be conveyed to the meeting participants via corresponding audio speakers 922 of computer devices 102. The transformed audio signals enhance the user speech while attenuating (e.g., reducing or removing) the noise.

Transformed audio signals 270 are also provided to speaker recognition module 230. The speaker recognition module processes the transformed audio signals to verify or recognize speech of a particular user in speech or voice signals 210. The speaker recognition module may employ a voice recognition model 232 to perform the speaker recognition. The voice recognition model may include a machine learning model as described below. The speaker recognition module provides an indication of the presence or absence of speech of the particular user to clean speech detector 240. A user identifier may be determined, or provided by the user, for retrieving a user speech profile or voiceprint for analyzing transformed audio signals 270. The voiceprint may be generated and stored in a database (e.g., model database 332, etc.) during registration of the user. The user identifier may include any identifier to indicate the user (e.g., user name or identification, handle, email, etc.).

Clean speech detector 240 processes transformed audio signals 270 to determine the presence of clean speech (e.g., speech of the user with no or low levels of competing-talker speech and other noise, etc.). The clean speech detector receives audio signals 215 and transformed audio signals 270 and compares transformed audio signals 270 to audio signals 215 to determine a difference that corresponds to a signal-to-noise ratio (SNR). For example, a large difference indicates removal of a significant amount of noise from audio signals 215 and corresponds to a low signal-to-noise ratio (SNR), while a small difference indicates removal of a low amount of noise from audio signals 215 and corresponds to a high signal-to-noise ratio (SNR). The clean speech detector may employ a noise detection model 242 to determine the difference corresponding to the signal-to-noise ratio (SNR). The noise detection model may include a machine learning model as described below. When the difference satisfies a threshold (e.g., indicating or corresponding to an amount of noise, etc.), audio signals 215 are considered to contain clean speech of the user. For example, when the difference is below a threshold level indicating a high signal-to-noise ratio (SNR), audio signals 215 are considered to contain clean speech. However, the difference or signal-to-noise ratio (SNR) may be compared to any threshold in any fashion to determine the presence of clean speech (e.g., greater than, greater than or equal to, less than, less than or equal to, equal to, etc.). By way of example, the threshold may be any value that corresponds to a signal-to-noise ratio (SNR) greater than or equal to 20 dB. Audio signals 215 containing clean speech and the corresponding user identifier are provided to training module 250.

Training module 250 stores audio signals 215 containing clean speech of the user (e.g., and a user identifier to associate the clean speech to the user), and uses the clean speech to generate training data for training (or updating or personalizing) noise removal model 222 of background noise removal (BNR) module 220 to the user as described below. The training module may adjust characteristics of the clean speech to produce training data. For example, the training module may introduce speech of individuals at various amplitude or power levels and/or other noise, and/or reverberation into the clean speech to produce training data. Further, ambient sounds during speech-free segments of live meetings or other communication sessions may be detected and recorded to supplement noise datasets used in training with a form of personalized noise. Various characteristics (e.g., classification of the ambient sounds into noise categories, distribution of types of noises, etc.) may further be used to improve the personalized noise removal model. By way of example, when a user in a home office has a dog that barks during calls, the dog bark may be attenuated (e.g., reduced or removed). Since the noise removal model is trained to preserve speech of a particular user, the noise removal model may attenuate (e.g., reduce or remove) all types of noise (e.g., echoes, reverberations, ambient sounds, speech of competing individuals, etc.). This provides improved performance and simplifies a noise removal pipeline since specialized processing (e.g., echo cancellation, etc.) in the noise removal pipeline may no longer be needed.

In an embodiment, the training module may maintain a database of speech features and a machine learning model (e.g., neural network coefficients or weights) for each user for a noise removal model 222 as a form of speech enhancement library. The library may be accessed to accelerate personalizing a noise removal model 222 for a user (e.g., a new or other user without a previously established personalized noise removal model, etc.). This may be accomplished by matching speech features of the user to speech features of other users stored in the library. The noise removal model of the library corresponding to a best match is selected as an initial noise removal model for adaptation or personalization to the user.

The versions of a noise removal model are periodically updated and evaluated. The evaluation determines performance of an updated version relative to the current version of the noise removal model. When the updated version provides improved performance, the updated version may replace the current version of the noise removal model employed by background noise removal (BNR) module 220.

The training data may be generated by a computer device 102 of a user, or by a different or separate computing device hosting speech transformation module 150 (e.g., meeting supervisor 104, etc.).

Figure 3:
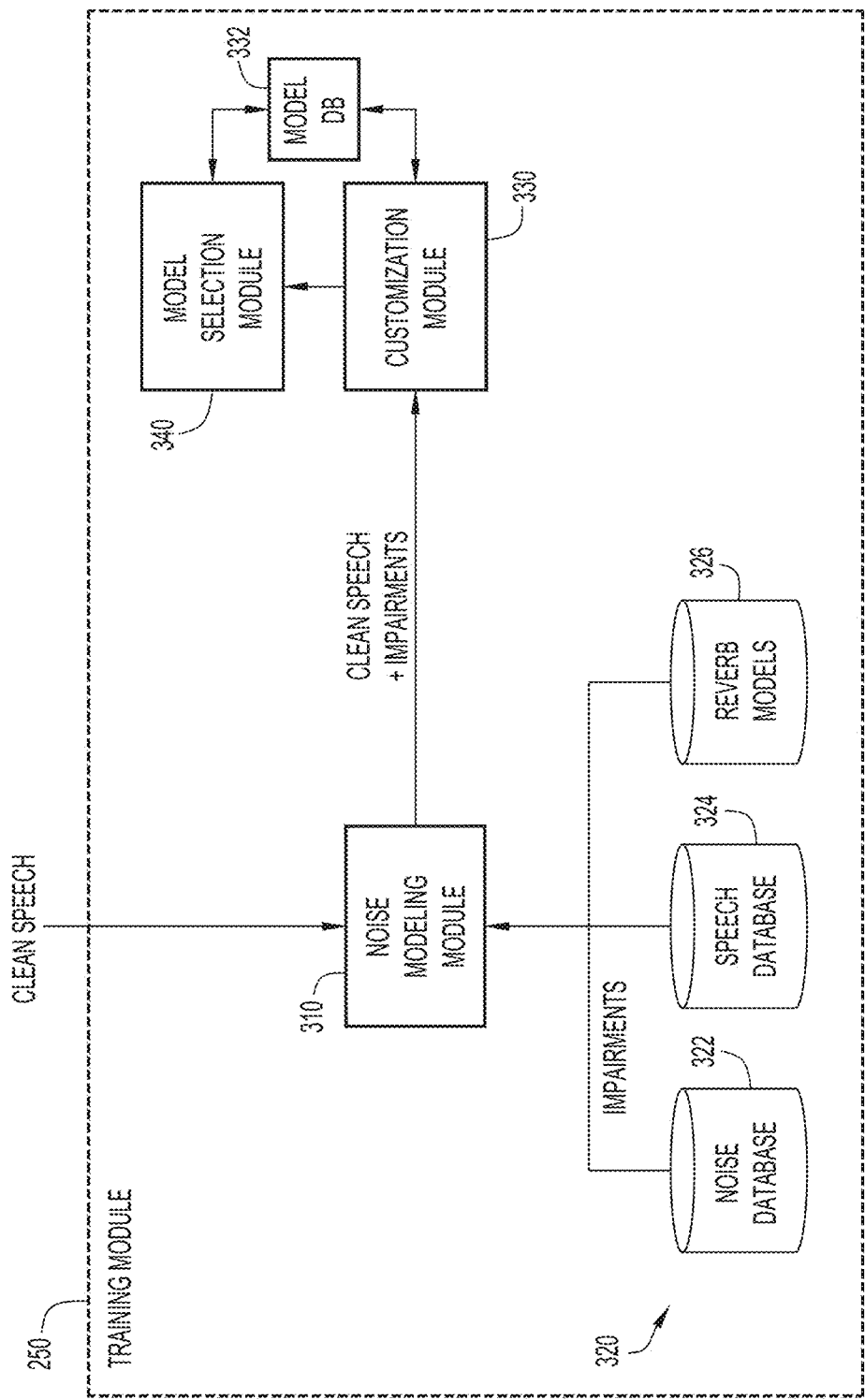
FIG. 3 illustrates a flow diagram for training a machine learning model to attenuate noise from speech signals, according to an example embodiment.

With continued reference to FIGS. 1 and 2, FIG. 3 illustrates training module 250 configured for training (or updating) noise removal model 222 of background noise removal (BNR) module 220 according to an example embodiment. While FIG. 3 is described with respect to transforming speech signals of a participant of an online meeting, it will be appreciated that speech signals may be transformed for any scenarios or activities involving voice (e.g., telephone or other calls, communications, audio messages, speech and/or voice recognition systems, public address systems, voice responsive systems for performing actions, etc.).

Training module 250 includes a noise modeling module 310, one or more data sources 320, a customization module 330, and a model selection module 340. Noise modeling module 310 adjusts characteristics of clean speech of users to produce training data. The noise modeling module receives clean speech of a user from clean speech detector 240 (FIG. 2) and stores the clean speech (e.g., and a user identifier to associate the clean speech with a user, etc.) in data sources 320. The data sources may include a noise database 322, a speech database 324, and a reverberation data source 326. Noise database 322 may store audio samples of various forms of noise of a surrounding environment (e.g., speech of competing individuals at various amplitude or power levels, sounds of a surrounding environment, noise from a microphone or other devices, noise detected during speech-free segments of live meetings or other communication sessions, etc.). Speech database 324 may store clean speech of users collected during live meetings, while reverberation data source 326 may store models or data representing reverberation. The noise modeling module combines or mixes clean speech of a user from speech database 324 with noise from noise database 324 and/or reverberation based on reverberation models or data from data source 326 to produce training data (e.g., audio samples of any combination of clean speech, noise, reverberation, etc.) for personalizing or customizing noise removal model 222 for the user. The corresponding clean speech and user specific noise may be stored and retrieved based on a user identifier.

The training data are provided to customization module 330 to periodically train or update noise removal model 222 for customization to the user (e.g., at a certain time interval, at a scheduled time, after a number of new training data, after a number of new clean speech samples are collected, etc.). The training data may be produced to train or generate a new version of noise removal model 222 based on new clean speech of the user collected during live meetings or other communication sessions. The customization model may store noise removal models 222 in model database 332 (e.g., based on a user identifier). Model selection module 340 evaluates performance of an updated version relative to the current version of the noise removal model. When the updated version provides improved performance, the model selection module informs background noise removal (BNR) module 220 to use the updated version to improve performance.

In addition, customization module 330 may maintain a model database 332 of speech features and store a noise removal model 222 (e.g., neural network coefficients or weights) for each user in the model database as a form of a speech enhancement library. The library may be accessed by model selection module 340 to accelerate customizing or personalizing a noise removal model 222 for a user (e.g., a new or other user without a previously established personalized noise removal model, etc.). This may be accomplished by matching speech features of the user to speech features of other users stored in the library. The noise removal model of the library corresponding to a best match is selected as an initial noise removal model for adaptation or personalization to the user. The initial noise removal model may be trained and updated with training data from noise modeling module 310 in substantially the same manner described above. The speech features may be derived from features used by voice recognition model 232, or from any conventional or other clustering techniques. Further, model selection module 340 may retrieve an existing noise removal model 222 for a user from model database 332 based on a user identifier.

Figure 4:
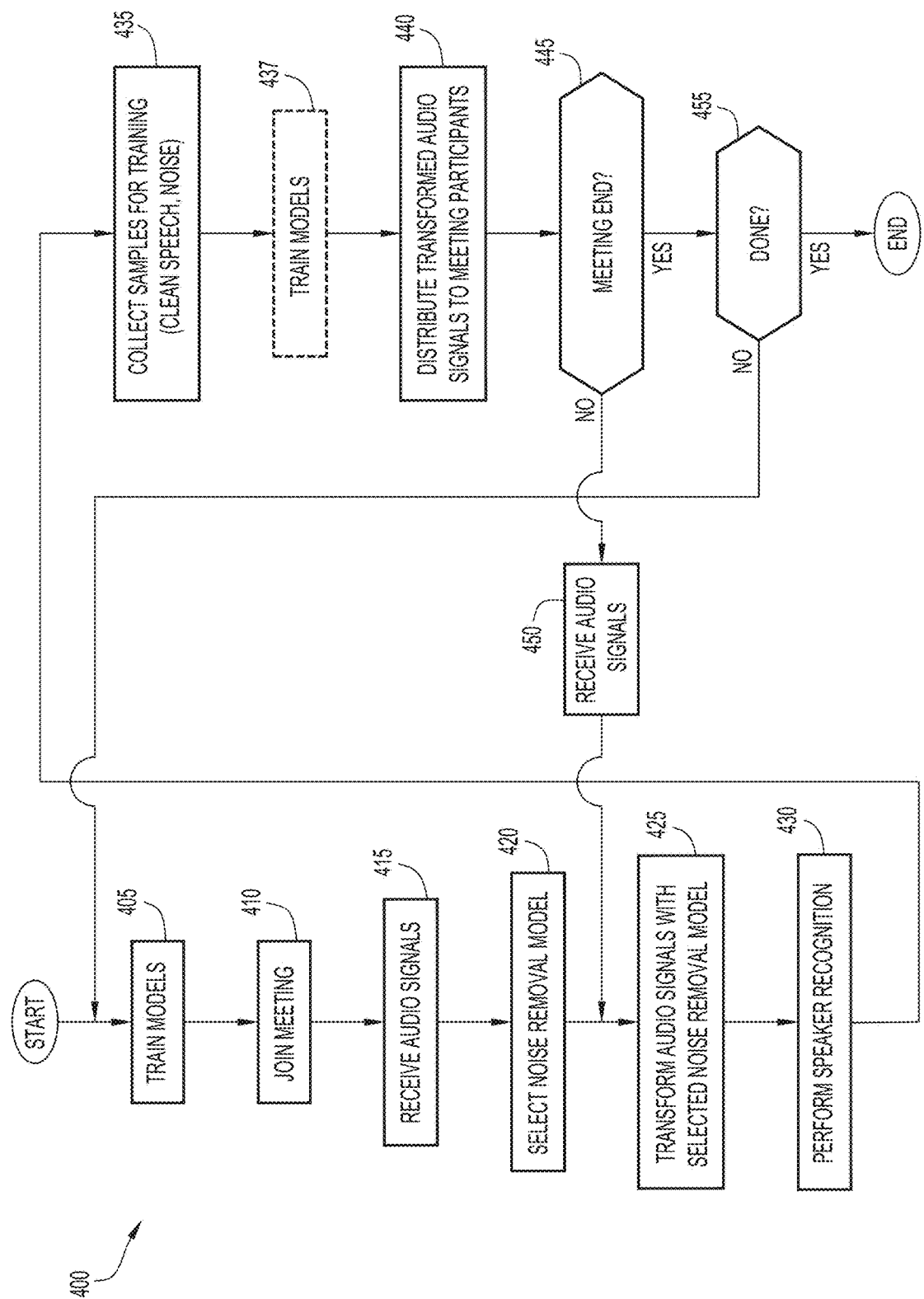
FIG. 4 is a flow diagram of a method for transforming speech signals to attenuate noise, according to an example embodiment.

With continued reference to FIGS. 1-3, FIG. 4 illustrates a flowchart of an example method 400 for processing speech signals to attenuate (e.g., reduce or remove) speech of competing individuals and other forms of noise according to an example embodiment. While FIG. 4 is described with respect to transforming speech signals of a participant of an online meeting, it will be appreciated that speech signals may be transformed for any scenarios or activities involving voice (e.g., telephone or other calls, communications, audio messages, speech and/or voice recognition systems, public address systems, voice responsive systems for performing actions, etc.).

The various machine learning models of background noise removal (BNR) module 220, speaker recognition module 230, and clean speech detector 240 are trained at operation 405 as described herein. This may accomplished by a computer device 102 of a corresponding user, or by another computing device (e.g., meeting supervisor 104, etc.). Noise removal model 222 of the BNR module may initially be trained for general noise removal (e.g., without customization to a specific user, etc.) as described below. The machine learning models may be periodically trained (e.g., at a certain time interval, at a scheduled time, after a number of new training data, etc.). The training may occur off-line, or dynamically during a meeting or other communication session. Thus, the machine learning models keep improving based on samples collected for training as described below.

Computer device 102 of a user enables the user to join an online meeting at operation 410. Camera or other image capture device 926 (FIG. 9) captures images (e.g., still images, video, etc.) of the user and a surrounding environment, and microphone or other sound sensing device 924 captures voice signals of the user and produces audio signals (corresponding to the voice signals) that are provided to speech transformation module 150.

Speech transformation module 150 receives audio signals from microphone 924 of a computer device 102 at operation 415. The audio signals preferably include a combination of user speech and noise (e.g., speech of competing individuals near the user, sounds of a surrounding environment, noise from a microphone or other devices, etc.). The speech transformation module may further receive or determine a user identifier indicating the user. For example, the user may provide the user identifier to join the meeting, and/or the speech transformation module may determine the user identifier from user provided or other information (e.g., location of the user, user account, etc.).

The user identifier is used to select a noise removal model for the user at operation 420. This may be accomplished by background noise removal (BNR) module 220 providing the user identifier to model selection module 340. The model selection module determines a presence of an associated noise removal model in model database 332. In other words, the model selection module determines presence of a previously established personalized noise removal model for the user. When the previous model exists, the previous model is selected and retrieved for the user for use by background noise removal (BNR) module 220. When a previous model does not exist for the user, a general noise removal model may initially be selected and used for the user.

In the event a personalized model has not been established for the user, personalizing the general noise removal model to the user may consume significant resources and time. In order to improve personalization of a noise removal model for the user, an example embodiment may identify a personalized model of another user in model database 332 with speech features similar to speech features of the user to use as the selected noise removal model as described below.

Noise removal model 222 of background noise removal (BNR) module 220 processes the audio signals to attenuate (e.g., reduce or remove) the noise at operation 425. The noise removal model may be initially trained for general noise removal to produce transformed speech signals. In other words, the speech transformation module produces transformed audio signals that enhance the speech of the user. The speech transformation module may partition the audio signals into audio segments of any size for processing (e.g., each segment may correspond to a certain number of seconds of voice signals (e.g., one or more seconds, portions of a second, etc.), a particular phoneme or word, etc.).

Noise removal model 222 may include any conventional or other machine learning models (e.g., mathematical/statistical, classifiers, feed-forward, recurrent, convolutional, deep learning, or other neural networks, etc.) to transform the audio signals to attenuate (e.g., reduce or remove) noise.

In an embodiment, noise removal model 222 may employ a neural network. For example, neural networks may include an input layer, one or more intermediate layers (e.g., including any hidden layers), and an output layer. Each layer includes one or more neurons, where the input layer neurons receive input (e.g., audio samples of users, feature vectors of audio samples, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the machine learning of the neural network may be performed using a training set of (noisy) audio samples as input and corresponding clean audio samples (with reduced or removed noise) as outputs, where the neural network attempts to produce the provided output and uses an error from the output (e.g., difference between produced and known outputs) to adjust weight (and bias) values (e.g., via backpropagation or other training techniques).

In an embodiment, noisy audio samples may be used for the training set as input, while their known corresponding clean audio samples (with reduced or removed noise) may be used for the training set as known output. In an embodiment, feature vectors may be extracted from the noisy audio samples and used for the training set as input, while their known corresponding clean audio samples (with reduced or removed noise) may be used for the training set as known output. A feature vector may include any suitable features of the audio samples (e.g., frequency, pitch, amplitude, phonemes or other speech characteristics, etc.). However, the training set may include any desired audio samples (e.g., clean, noisy, etc.) of any persons to learn the characteristics for transforming speech signals.

The output layer of the neural network indicates the transformed audio signal (with reduced or removed noise) for input data. Further, the output layer neurons may indicate a probability for the input data being associated with a corresponding output. The received audio signals are provided to the neural network to produce the transformed audio signals. The neural network may be initially trained for general noise removal, and may be customized to a specific user as described below. The training data for general noise removal may include various audio samples and known clean outputs, while the training data for personalized noise removal includes audio samples specific to the user as described below and known clean outputs.

In an embodiment, noise removal model 222 may include an embedding network that produces and uses embeddings for transforming audio samples. Basically, each audio sample may be represented by a vector having numeric elements corresponding to a plurality of dimensions defining a space. User speech may have similar embeddings or vector representations, thereby residing in a common area of the space defined by the embedding dimensions. Noise may have different embeddings and reside in a different area of the space defined by the embedding dimensions. This enables the user speech and noise to be separated or differentiated. The embedding network may be implemented by a neural network substantially similar to the neural network described above, and produce and use embeddings based on an analysis of various features of audio samples of user speech and/or noise. The noise removal model may be trained to transform noisy audio signals with an embedding outside the area of user speech to audio signals having an embedding within the area of user speech, thereby effectively reducing or removing noise. The training data may include audio samples and embeddings as input and corresponding transformed audio samples and corresponding embeddings as output, where the noise removal model may be trained in substantially the same manner described above.

The transformed audio signals are used to identify speech of the user in the received audio signals at operation 430. Initially, voice recognition model 232 of speaker recognition module 230 processes the transformed audio signals to verify or identify speech of the user in the speech or voice signals. The voice recognition model may use a user voice profile or voiceprint to perform the analysis. The user profile or voiceprint may be generated and stored (e.g., in a data source 320, model database 332, etc.) during registration of the user, and retrieved based on the user identifier. The user profile or voiceprint includes various features (e.g., frequency, pitch, amplitude, phonemes or other speech characteristics, etc.) extracted from samples of the user voice obtained during registration. The voice recognition model 232 may include any conventional or other machine learning models (e.g., mathematical/statistical, classifiers, feed-forward, recurrent, convolutional, deep learning, or other neural networks, etc.) to perform the speaker recognition.

In an embodiment, voice recognition model 232 may employ a neural network substantially similar to the neural network described above (e.g., for noise removal model 222, etc.). Audio samples and corresponding user voice profiles or voiceprints may be used for the training set as input, while their known corresponding classifications (e.g., a class indicating the presence of speech of the particular user, a class indicating the absence of speech of the particular user, etc.) may be used for the training set as known output. In an embodiment, feature vectors may be extracted from the audio samples and used with the user voice profiles or voiceprints for the training set as input, while their known corresponding classifications (e.g., presence of speech of the particular user, absence of speech of the particular user, etc.) may be used for the training set as known output. A feature vector may include any suitable features of the audio samples (e.g., frequency, pitch, amplitude, phonemes or other speech characteristics, etc.). However, the training set may include any desired audio samples of any persons for the different classes to learn the characteristics for recognizing speech of particular users.

The output layer of the neural network indicates a classification (e.g., presence of speech of the particular user, absence of speech of the particular user, etc.) for input data. By way of example, the classes used for the classification may include a class associated with a presence of speech of the particular user and an absence of speech of the particular user. The output layer neurons may provide a classification (or specify a particular class) that indicates the presence or absence of speech of the particular user. Further, output layer neurons may be associated with the different classes indicating the presence or absence of speech of the particular user, and indicate a probability for the input data being within a corresponding class (e.g., a probability of the input data being in a class associated with a presence of speech of the particular user, a probability of the input data being in a class associated with an absence of speech of the particular user etc.). The class associated with the highest probability is preferably selected as the class for the input data. In other words, the indication (e.g., presence or absence of speech for the particular user, etc.) associated with the class having the highest probability is considered the indication for the input data (e.g., captured audio signals of the user, etc.). The transformed audio signals and user voiceprint are provided to the neural network to verify or recognize speech of the user based on the resulting classification.

The transformed audio signals are processed to collect samples for training at operation 435. When speaker recognition module 230 verifies or identifies the speech of the user, clean speech detector 240 processes the transformed audio signals to determine the presence of clean speech (e.g., speech of the user with no or low levels of competing-talker speech and other noise, etc.). When clean speech is detected, the received audio signals corresponding to the clean speech are stored in database 324 (e.g., based on the user identifier, etc.) to generate training data.

In addition, ambient sounds during speech-free segments of live meetings or other communication sessions may be detected and recorded to supplement noise datasets used in training with a form of personalized noise. The various machine learning models of background noise removal (BNR) module 220, speaker recognition module 230, and clean speech detector 240 may be trained based on new samples at operation 437 as described herein. Thus, the machine learning models keep improving based on the samples collected for training. The machine learning models may be periodically trained (e.g., at a certain time interval, at a scheduled time, after a number of new training data, etc.). The training may occur off-line, or dynamically during a meeting or other communication session.

The transformed audio signals are distributed to computer devices 102 of other users for conveyance as transformed speech signals (with reduced or removed noise) to meeting participants via corresponding audio speakers 922 at operation 440. Captured images may also be distributed to meeting participants and conveyed via corresponding displays 930. When the meeting continues as determined at operation 445, additional audio signals of the user are received at operation 450, and the above process is repeated from operation 425 in substantially the same manner described above. When the meeting ends, the above process repeats from operation 405 (e.g., training of the machine learning models based on new training samples) for another meeting in substantially the same manner described above until termination (e.g., power down, etc.) as determined at operation 455.

Figure 5:
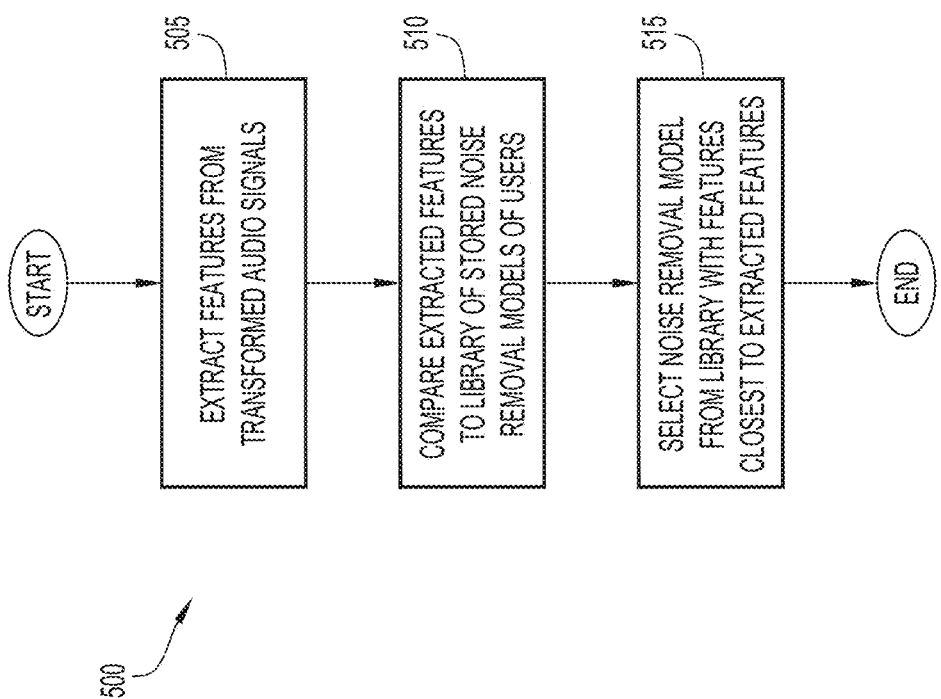
FIG. 5 is a flow diagram of a method for selecting a noise removal model for a user, according to an example embodiment.

With continued reference to FIGS. 1-4, FIG. 5 illustrates a flowchart of an example method 500 for selecting a noise removal model for a user based on speech features according to an example embodiment. The method may correspond to operation 420 of FIG. 4 described above. While FIG. 5 is described with respect to transforming speech signals of a participant of an online meeting, it will be appreciated that speech signals may be transformed for any scenarios or activities involving voice (e.g., telephone or other calls, communications, audio messages, speech and/or voice recognition systems, public address systems, voice responsive systems for performing actions, etc.).

Initially, a user may join an online meeting, and speech transformation module 150 receives audio signals from microphone 924 of a computer device 102 in substantially the same manner described above. The audio signals preferably include a combination of user speech and noise (e.g., speech of competing individuals, sounds of a surrounding environment, noise from a microphone or other devices, etc.).

In the event a personalized model has not been established for the user, personalizing a general noise removal model to the user may consume significant resources and time. In order to improve personalization of a noise removal model for the user, an example embodiment identifies a personalized model of another user with speech features similar to the speech features of the user to use as the selected noise removal model. Since the personalized noise removal model of the similar user is already trained, customization of that model to the user is faster and requires less training and computing and other resources. Customization module 330 may maintain a database of speech features and a machine learning model (e.g., neural network coefficients or weights) for each user for a noise removal model 222 as a form of speech enhancement library as described above. The library may be accessed by model selection module 340 to accelerate personalizing a noise removal model 222 for the user.

Speech features may be extracted from the received audio signals, or from audio signals transformed by background noise removal (BNR) module 220 using a general noise removal model, at operation 505. The speech features may be derived from features used by voice recognition model 232 (e.g., frequency, pitch, amplitude, phonemes or other speech characteristics, etc.), or from any conventional or other clustering techniques as described below. Model selection module 340 compares or matches the extracted speech features of the user to speech features of other users (associated with the noise removal models) stored in the library at operation 510. The model selection module selects the noise removal model of the library corresponding to a best match as an initial noise removal model for adaptation or personalization to the user at operation 515. This may be accomplished by forming feature vectors of the extracted and stored features and determining a distance or other similarity measure (e.g., cosine similarity, Euclidean or other distance, etc.) between the feature vectors. The feature vector associated with a noise removal model of the library having a closest similarity or least distance measure to the feature vector of the user may be selected as the initial noise removal model for the user.

In an embodiment, any conventional or other clustering techniques may be used to select the noise removal model from the library. The clustering techniques may employ any conventional or other machine learning models (e.g., mathematical/statistical, classifiers, feed-forward, recurrent, convolutional, deep learning, or other neural networks, etc.). In this case, each stored noise removal model may be considered a cluster, and the extracted features are processed to be placed in a cluster based on correspondence of the extracted features to the speech features associated with the noise removal model of the clusters. The noise removal model associated with the cluster assigned to the extracted features of the user may be selected as the initial noise removal model for the user.

Figure 6:
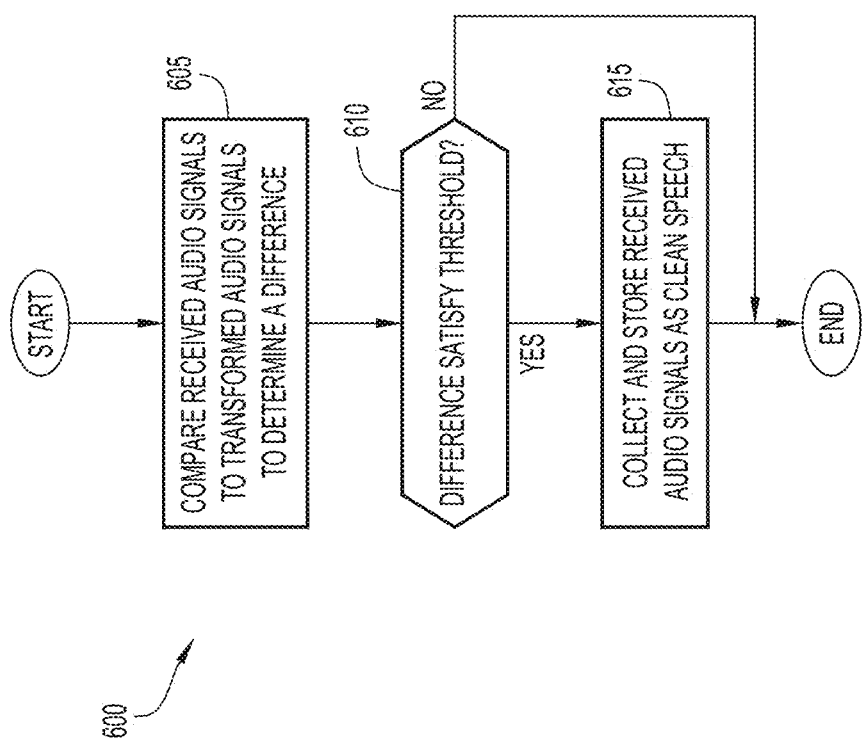
FIG. 6 is a flow diagram of a method for collecting clean speech during an online meeting or other communication session for training a noise removal model, according to an example embodiment.

With continued reference to FIGS. 1-5, FIG. 6 illustrates a flowchart of an example method 600 for collecting clean speech during an online meeting or other communication session for training a noise removal model according to an example embodiment. The method may correspond to operation 435 of FIG. 4 described above. While FIG. 6 is described with respect to transforming speech signals of a participant of an online meeting, it will be appreciated that speech signals may be transformed for any scenarios or activities involving voice (e.g., telephone or other calls, communications, audio messages, speech and/or voice recognition systems, public address systems, voice responsive systems for performing actions, etc.).

Initially, a user may join an online meeting, and speech transformation module 150 receives audio signals from microphone 924 of a computer device 102 in substantially the same manner described above. The audio signals preferably include a combination of user speech and noise (e.g., speech of competing individuals, sounds of a surrounding environment, noise from a microphone or other devices, etc.). The received audio signals are transformed by a selected noise removal model in substantially the same manner described above.

Clean speech detector 240 processes the transformed audio signals from the selected noise removal model to determine the presence of clean speech (e.g., speech of the user with no or low levels of competing-talker speech and other noise, etc.). Noise detection model 242 of the clean speech detector compares the transformed audio signals to the received audio signals to determine a difference at operation 605. The difference corresponds to a signal-to-noise ratio (SNR) of the received audio signals. For example, a large difference indicates removal of a significant amount of noise from the received audio signals and corresponds to a low signal-to-noise ratio (SNR), while a small difference indicates removal of a low amount of noise from the received audio signals and corresponds to a high signal-to-noise ratio (SNR). Noise detection model 242 may include any conventional or other machine learning models (e.g., mathematical/statistical, classifiers, feed-forward, recurrent, convolutional, deep learning, or other neural networks, etc.) to determine the difference.

In an embodiment, noise detection model 242 may employ a neural network substantially similar to the neural network described above (e.g., for noise removal model 222, voice recognition model 232, etc.). The neural network may be trained using a training set of pairs of audio samples as input, while their known corresponding differences (corresponding to signal-to-noise ratios (SNR)) may be used for the training set as known output. In an embodiment, feature vectors may be extracted from the audio samples and used for the training set as input, while their known corresponding differences (corresponding to signal-to-noise ratios (SNR)) may be used for the training set as known output. A feature vector may include any suitable features of the audio samples (e.g., frequency, pitch, amplitude, etc.). However, the training set may include any desired audio samples to learn the characteristics for determining the differences corresponding to signal-to-noise ratios (SNR).

The output layer of the neural network indicates a difference (corresponding to a signal-to-noise ratio (SNR)) for input data. Further, output layer neurons may indicate a probability for the input data having a corresponding difference. The received and transformed audio signals are provided to the neural network to determine the difference corresponding to the signal-to-noise ratio (SNR).

When the difference between the received and transformed audio signals satisfies a threshold (e.g., indicating or corresponding to an amount of noise, etc.) as determined at operation 610, the received audio signals are considered to contain clean speech of the user. For example, the threshold may be a value for which differences below the value correspond to a sufficiently high signal-to-noise ratio (SNR) indicating clean or substantially clean speech. The threshold may be any value that corresponds to a signal-to-noise ratio (SNR) greater than or equal to 20 dB. The received audio signals of clean speech are collected and provided (along with a corresponding user identifier to associate the clean speech with a user) to training module 250 for storage in speech database 324 at operation 615. The collected clean speech are used to generate training data for training or personalizing the noise removal model as described herein.

Figure 7:
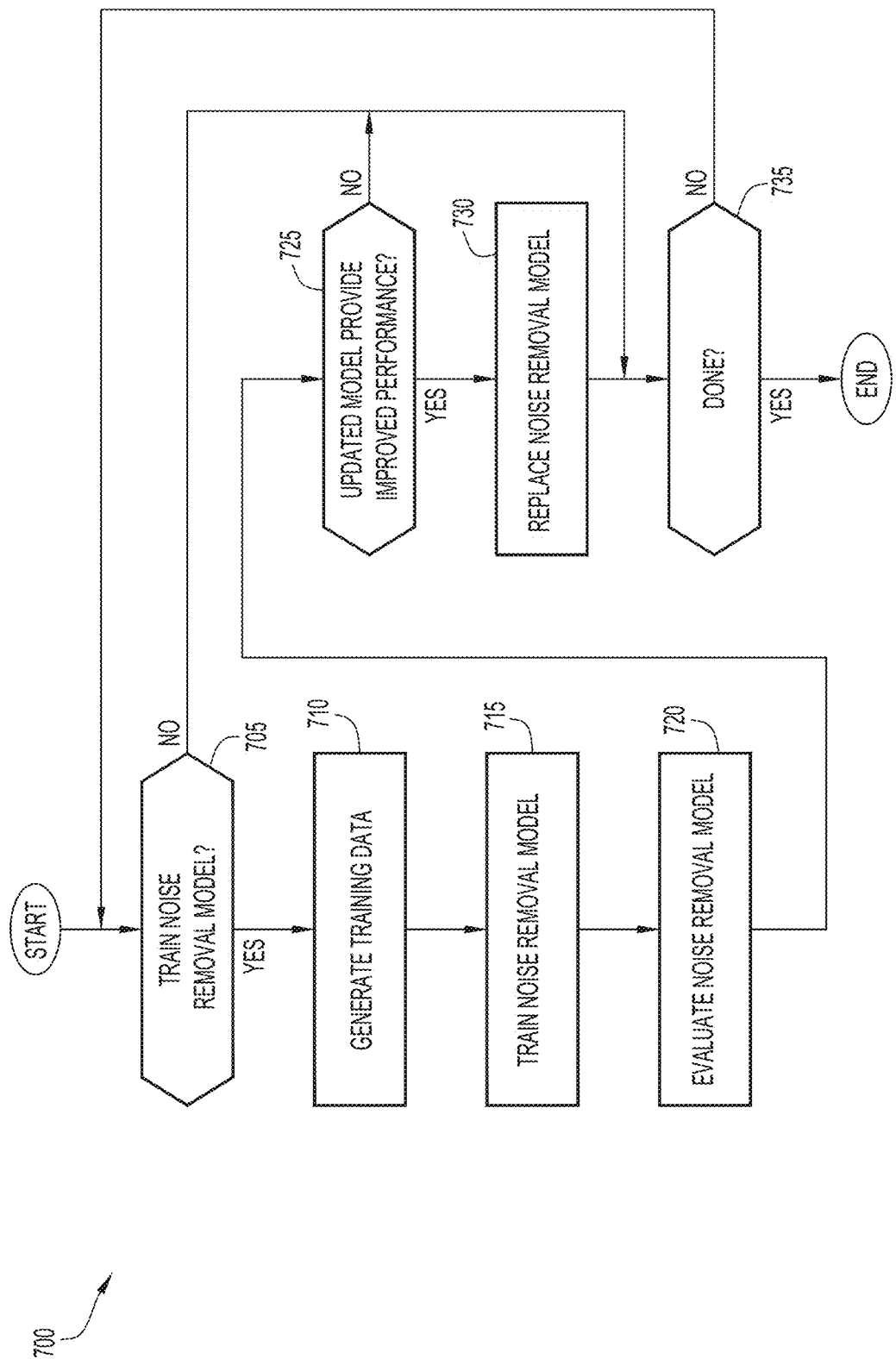
FIG. 7 is a flow diagram of a method for training and evaluating a noise removal model, according to an example embodiment.

With continued reference to FIGS. 1-6, FIG. 7 illustrates a flowchart of an example method 700 for training and evaluating a noise removal model according to an example embodiment. While FIG. 7 is described with respect to transforming speech signals of a participant of an online meeting, it will be appreciated that speech signals may be transformed for any scenarios or activities involving voice (e.g., telephone or other calls, communications, audio messages, speech and/or voice recognition systems, public address systems, voice responsive systems for performing actions, etc.).

Initially, a user may join an online meeting, and speech transformation module 150 receives audio signals from microphone 924 of a computer device 102 in substantially the same manner described above. The audio signals preferably include a combination of user speech and noise (e.g., speech of competing individuals, sounds of a surrounding environment, noise from a microphone or other devices, etc.). The received audio signals are transformed by a selected noise removal model for clean speech detection and collection in substantially the same manner described above.

Noise removal model 222 for the user is periodically trained for customization to the user (e.g., at a certain time interval, at a scheduled time, after a number of new training data, after a number of new clean speech samples are collected, etc.). The training may occur off-line, or dynamically during a meeting or other communication session. When the noise removal model is to be trained as determined at operation 705, training data is generated at operation 710. Noise modeling module 310 adjusts characteristics of clean speech of users to generate the training data. The noise modeling module receives clean speech of a user from clean speech detector 240 (e.g., during meetings or other communication sessions) and stores the clean speech in data sources 320 as described above. The noise modeling module mixes or combines clean speech of the user from speech database 324 (e.g., retrieved based on the user identifier, etc.) with noise from noise database 324 and/or reverberation based on reverberation models and/or data from data source 326 to produce training data (e.g., audio samples of any combination of clean speech, noise, reverberation, etc.) for personalizing or customizing noise removal model 222 for the user.

The training data are used to train noise removal model 222 of the user at operation 715. The training data are provided to customization module 330 to train or customize noise removal model 222 for the user. The training data may be produced and used to train or generate a new or updated version of noise removal model 222 for the user based on new clean speech of the user collected during live meetings or other communication sessions. The noise removal model may be trained using the generated training data in substantially the same manner described above. The customization module may store the new or updated version in model database 332 (e.g., based on the user identifier, etc.). Model selection module 340 evaluates performance of the updated version relative to the current version of the noise removal model at operation 720. For example, accuracy may be measured between the current and updated versions. A portion of the training data may be used as testing data and provided to the current and updated versions. The amount of correct outputs for the testing data (e.g., quantity or percentage of correct outputs, etc.) may be used to compare performance. However, any suitable performance metric or combination of performance metrics may be used (e.g., accuracy, running or processing time, etc.).

When the updated version provides improved performance (e.g., greater quantity or percentage of correct outputs, etc.) as determined at operation 725, the background noise removal (BNR) module 220 replaces the current version with the updated version at operation 730 to improve performance. The above process repeats from operation 705 in substantially the same manner described above until termination (e.g., power down, removal of a user or model, etc.) as determined at operation 735.

Figure 8:
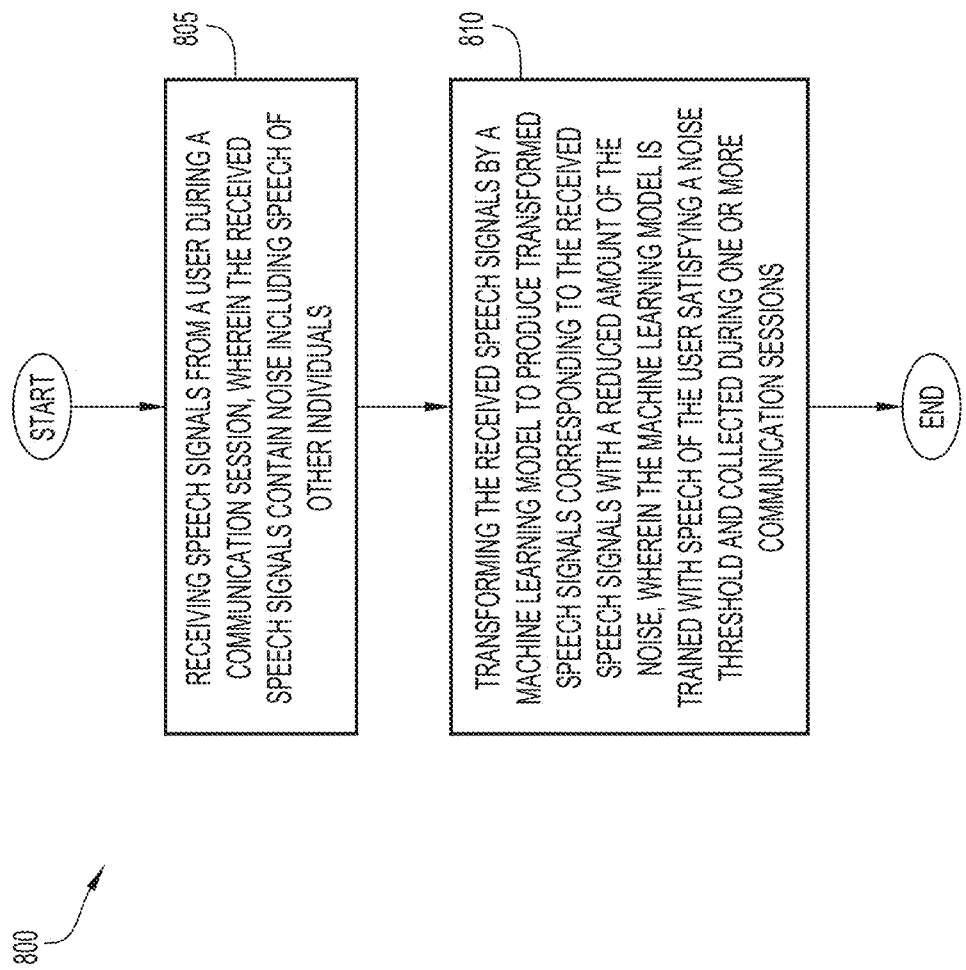
FIG. 8 illustrates a flowchart of a generalized method for transforming speech signals to attenuate noise, according to an example embodiment.

FIG. 8 is a flowchart of an example method 800 for transforming speech signals to attenuate noise according to an example embodiment. At operation 805, speech signals are received from a user during a communication session. The received speech signals contain noise including speech of other individuals. At operation 810, the received speech signals are transformed by a machine learning model to produce transformed speech signals corresponding to the received speech signals with a reduced amount of the noise. The machine learning model is trained with speech of the user satisfying a noise threshold and collected during one or more communication sessions.

Figure 9:
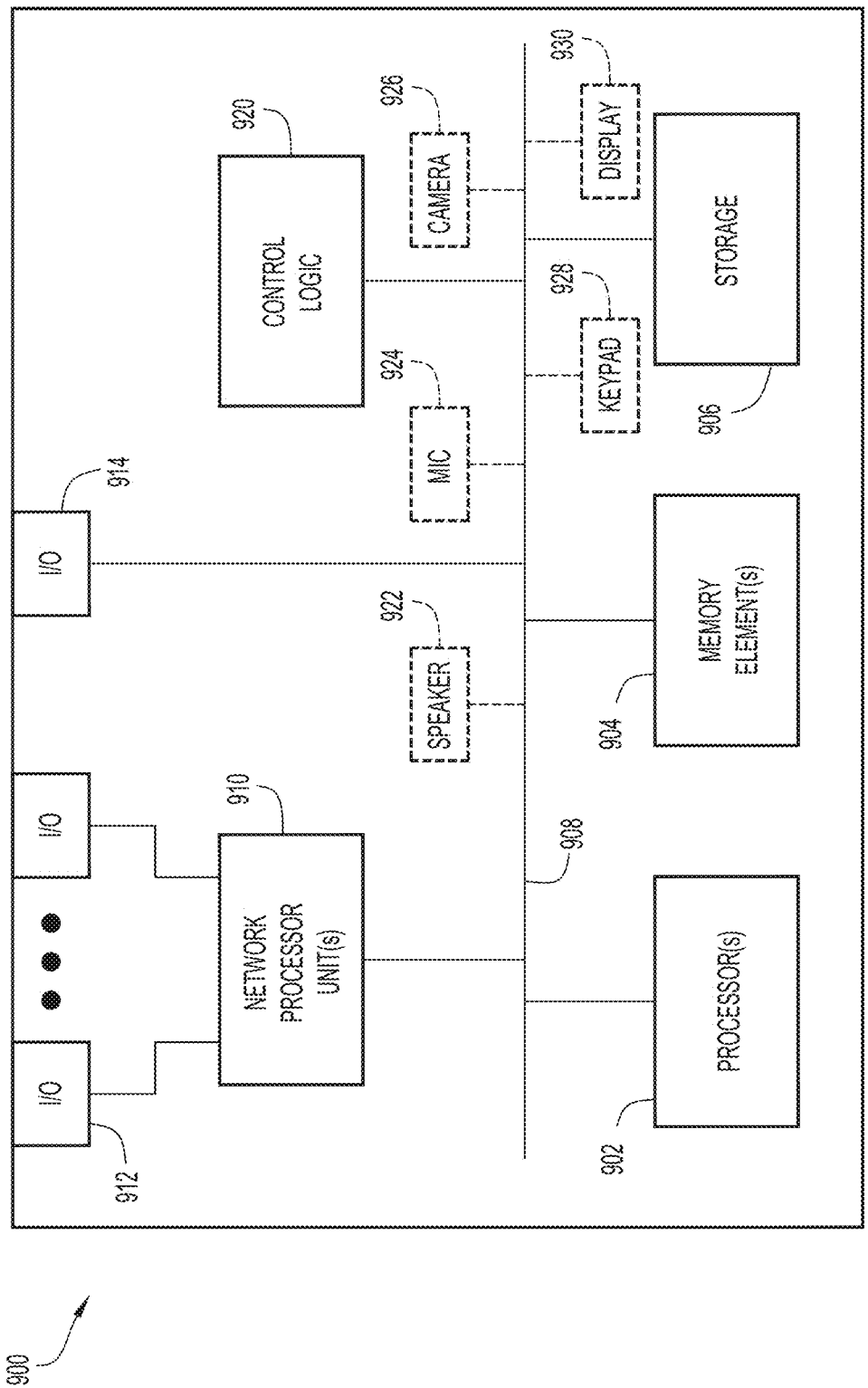
FIG. 9 illustrates a hardware block diagram of a computing device configured to perform functions associated with transforming speech signals to attenuate noise as discussed herein, according to an example embodiment.

Referring to FIG. 9, FIG. 9 illustrates a hardware block diagram of a computing device 900 that may perform functions associated with operations discussed herein in connection with the techniques depicted in FIGS. 1-8. In various embodiments, a computing device or apparatus, such as computing device 900 or any combination of computing devices 900, may be configured as any device entity/entities (e.g., computer devices, meeting supervisor or other server systems, endpoint devices, etc.) as discussed for the techniques depicted in connection with FIGS. 1-8 in order to perform operations of the various techniques discussed herein.

In at least one embodiment, computing device 900 may be any apparatus that may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory elements 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interfaces 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, endpoint device, etc.), computing device 900 may further include, or be coupled to, an audio speaker 922 to convey sound, microphone or other sound sensing device 924, camera or image capture device 926, a keypad or keyboard 928 to enter information (e.g., alphanumeric information, etc.), and/or a touch screen or other display 930. These items may be coupled to bus 908 or I/O interface(s) 914 to transfer data with other elements of computing device 900.

In various embodiments, control logic 920 can include instructions that, when executed, cause processor(s) 902 to perform operations, which can include, but not be limited to, providing overall control operations of computing device 900; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Present embodiments may provide various technical and other advantages. In an embodiment, speech signals are processed by a machine learning model in order to attenuate (e.g., reduce or remove) various forms of noise and provide significantly enhanced results (e.g., speech signals without the noise, etc.). The machine learning model is personalized or trained to a specific user based on clean speech collected during live meetings or other communication sessions to provide enhanced accuracy. Since the machine learning model is trained to enhance speech of a particular user, the noise removal model may attenuate (e.g., reduce or remove) all types of noise (e.g., echoes, reverberations, ambient sounds, speech of competing individuals, etc.). This provides improved performance and simplifies a noise removal pipeline since specialized processing (e.g., echo cancellation, etc.) in the noise removal pipeline may no longer be needed.

In an embodiment, training data can be efficiently produced (through combining or mixing the clean speech with noise or other variants) that simulates various types of noise (including noise effects) to improve accuracy and training of machine learning models. Further, noise specific to a user or user environment may be captured during speech-free segments and used to train or personalize the machine learning model for improved accuracy.

Moreover, personalizing a general noise removal model to a user may consume significant resources and time. In order to improve personalization of a noise removal model for the user, an example embodiment identifies a personalized model of another user with speech features similar to the speech features of the user to use as the noise removal model. Since the personalized noise removal model of the similar user is already trained, customization of that model to the user is faster and requires less training and computing and other resources.

In addition, the machine learning model may be dynamically updated or personalized to a user as clean speech is collected during live meetings and other communication sessions. Further, the machine learning model may be continuously updated (or trained) based on user feedback or measurements indicating a quality of the transformed speech signals. For example, user feedback or measurements may indicate a poor quality signal (e.g., high noise level, etc.). The feedback may be used to update or train the machine learning model with new or different training data (e.g., derived from new clean speech, different combinations of clean speech and noise, etc.) to improve attenuation (e.g., reduction or removal) of noise. Thus, the machine learning model may continuously evolve (or be trained) to learn characteristics of a specific user and/or improve noise reduction.

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory elements 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm·wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s)

and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: receiving speech signals from a user during a communication session, wherein the received speech signals contain noise including speech of other individuals; and transforming the received speech signals by a machine learning model to produce transformed speech signals corresponding to the received speech signals with a reduced amount of the noise, wherein the machine learning model is trained with speech of the user satisfying a noise threshold and collected during one or more communication sessions.

In one example, the method further comprises training the machine learning model with user specific noise data to customize the machine learning model to the user.

In one example, the method further comprises generating training data to customize the machine learning model to the user by combining the collected speech of the user with one or more from a group of sounds, speech of individuals, and reverberations.

In one example, the method further comprises detecting sounds of a surrounding environment of the user during segments of the one or more communication sessions lacking speech, wherein the user specific noise data includes the detected sounds to customize the machine learning model to the user.

In one example, the method further comprises: determining that performance of an updated version of the machine learning model exceeds a current version of the machine learning model, wherein the updated version of the machine learning model is trained with data collected from one or more new communication sessions; and replacing the current version of the machine learning model with the updated version of the machine learning model.

In one example, the method further comprises selecting the machine learning model to customize to the user from a library of machine learning models associated with other users based on a comparison of speech features of the user to speech features of the other users.

In one example, transforming the received speech signals further comprises producing the transformed speech signals by the machine learning model maintaining the speech signals of the user and removing the noise contained in the received speech signals.

In another form, an apparatus is provided. The apparatus comprises: a computing system comprising one or more processors, wherein the one or more processors are configured to: receive speech signals from a user during a communication session, wherein the received speech signals contain noise including speech of other individuals; and transform the received speech signals by a machine learning model to produce transformed speech signals corresponding to the received speech signals with a reduced amount of the noise, wherein the machine learning model is trained with speech of the user satisfying a noise threshold and collected during one or more communication sessions.

In another form, one or more non-transitory computer readable storage media are provided. The non-transitory computer readable storage media are encoded with processing instructions that, when executed by one or more processors, cause the one or more processors to: receive speech signals from a user during a communication session, wherein the received speech signals contain noise including speech of other individuals; and transform the received speech signals by a machine learning model to produce transformed speech signals corresponding to the received speech signals with a reduced amount of the noise, wherein the machine learning model is trained with speech of the user satisfying a noise threshold and collected during one or more communication sessions.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving speech signals from a user during a communication session, wherein the speech signals contain noise including speech of other individuals;
   transforming the speech signals by a machine learning model to produce transformed speech signals corresponding to the speech signals with a reduced amount of the noise;
   determining a difference between the transformed speech signals and the speech signals, wherein the difference corresponds to a signal to noise ratio for the speech signals;
   collecting the speech signals as clean speech of the user based on the difference satisfying a noise threshold for the signal to noise ratio, wherein the clean speech includes the speech signals with the difference corresponding to the signal to noise ratio of at least a predetermined decibel level;
   generating an updated version of the machine learning model by training the machine learning model based on the clean speech; and
   replacing the machine learning model with the updated version of the machine learning model when performance of the updated version of the machine learning model exceeds performance of the machine learning model.

2. The method of claim 1, further comprising:
   training the machine learning model with user specific noise data to customize the machine learning model to the user.

3. The method of claim 2, further comprising:
   generating training data to customize the machine learning model to the user by combining speech of the user with one or more from a group of sounds, speech of individuals, and reverberations.

4. The method of claim 2, further comprising:
   detecting sounds of a surrounding environment of the user during segments of one or more communication sessions lacking speech, wherein the user specific noise data includes the sounds to customize the machine learning model to the user.

5. The method of claim 1, wherein the predetermined decibel level is twenty decibels and generating the updated version of the machine learning model further comprises:
   training the machine learning model with data collected from one or more new communication sessions.

6. The method of claim 1, further comprising:
   selecting the machine learning model to customize to the user from a library of machine learning models associated with other users based on a comparison of speech features of the user to speech features of the other users.

7. The method of claim 1, wherein transforming the speech signals further comprises:
   producing the transformed speech signals by the machine learning model maintaining speech of the user and removing the noise contained in the speech signals.

8. An apparatus comprising:
   a computing system comprising one or more processors, wherein the one or more processors are configured to perform operations including:
     receiving speech signals from a user during a communication session, wherein the speech signals contain noise including speech of other individuals;
     transforming the speech signals by a machine learning model to produce transformed speech signals corresponding to the speech signals with a reduced amount of the noise;
     determining a difference between the transformed speech signals and the speech signals, wherein the difference corresponds to a signal to noise ratio for the speech signals;
     collecting the speech signals as clean speech of the user based on the difference satisfying a noise threshold for the signal to noise ratio, wherein the clean speech includes the speech signals with the difference corresponding to the signal to noise ratio of at least a predetermined decibel level;
     generating an updated version of the machine learning model by training the machine learning model based on the clean speech; and
     replacing the machine learning model with the updated version of the machine learning model when performance of the updated version of the machine learning model exceeds performance of the machine learning model.

9. The apparatus of claim 8, wherein the one or more processors are further configured to perform operations including:
   training the machine learning model with user specific noise data to customize the machine learning model to the user.

10. The apparatus of claim 9, wherein the one or more processors are further configured to perform operations including:
    generating training data to customize the machine learning model to the user by combining speech of the user with one or more from a group of sounds, speech of individuals, and reverberations, wherein the sounds are detected within a surrounding environment of the user during segments of one or more communication sessions lacking speech.

11. The apparatus of claim 8, wherein the predetermined decibel level is twenty decibels and generating the updated version of the machine learning model further comprises:
    training the machine learning model with data collected from one or more new communication sessions.

12. The apparatus of claim 8, wherein the one or more processors are further configured to perform operations including:
    selecting the machine learning model to customize to the user from a library of machine learning models associated with other users based on a comparison of speech features of the user to speech features of the other users.

13. The apparatus of claim 8, wherein transforming the speech signals further comprises:
    producing the transformed speech signals by the machine learning model maintaining speech of the user and removing the noise contained in the speech signals.

14. One or more non-transitory computer readable storage media encoded with processing instructions that, when executed by one or more processors, cause the one or more processors to perform operations including:
    receiving speech signals from a user during a communication session, wherein the speech signals contain noise including speech of other individuals;
    transforming the speech signals by a machine learning model to produce transformed speech signals corresponding to the speech signals with a reduced amount of the noise;
    determining a difference between the transformed speech signals and the speech signals, wherein the difference corresponds to a signal to noise ratio for the speech signals;
    collecting the speech signals as clean speech of the user based on the difference satisfying a noise threshold for the signal to noise ratio, wherein the clean speech includes the speech signals with the difference corresponding to the signal to noise ratio of at least a predetermined decibel level;
    generating an updated version of the machine learning model by training the machine learning model based on the clean speech; and
    replacing the machine learning model with the updated version of the machine learning model when performance of the updated version of the machine learning model exceeds performance of the machine learning model.

15. The one or more non-transitory computer readable storage media of claim 14, wherein the processing instructions further cause the one or more processors to perform operations including:
    training the machine learning model with user specific noise data to customize the machine learning model to the user.

16. The one or more non-transitory computer readable storage media of claim 15, wherein the processing instructions further cause the one or more processors to perform operations including:
    generating training data to customize the machine learning model to the user by combining speech of the user with one or more from a group of sounds, speech of individuals, and reverberations.

17. The one or more non-transitory computer readable storage media of claim 15, wherein the processing instructions further cause the one or more processors to perform operations including:
    detecting sounds of a surrounding environment of the user during segments of one or more communication sessions lacking speech, wherein the user specific noise data includes the sounds to customize the machine learning model to the user.

18. The one or more non-transitory computer readable storage media of claim 14, wherein the predetermined decibel level is twenty decibels and generating the updated version of the machine learning model further comprises:
    training the machine learning model with data collected from one or more new communication sessions.

19. The one or more non-transitory computer readable storage media of claim 14, wherein the processing instructions further cause the one or more processors to perform operations including:
    selecting the machine learning model to customize to the user from a library of machine learning models associated with other users based on a comparison of speech features of the user to speech features of the other users.

20. The one or more non-transitory computer readable storage media of claim 14, wherein transforming the speech signals further comprises:
    producing the transformed speech signals by the machine learning model maintaining speech of the user and removing the noise contained in the speech signals.

* * * * *